United States Patent
Miura

(10) Patent No.: US 7,846,050 B2
(45) Date of Patent: Dec. 7, 2010

(54) POWER TRANSMISSION CHAIN AND POWER TRANSMISSION APPARATUS

(75) Inventor: Yoshihisa Miura, Yamatokoriyama (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 115 days.

(21) Appl. No.: 11/822,988

(22) Filed: Jul. 11, 2007

(65) Prior Publication Data

US 2008/0015070 A1   Jan. 17, 2008

(30) Foreign Application Priority Data

Jul. 13, 2006   (JP)   ............... P2006-192411

(51) Int. Cl.
*F16G 5/18*   (2006.01)
(52) U.S. Cl. .................................... 474/245
(58) Field of Classification Search ............... 474/240, 474/242, 244, 245, 272
See application file for complete search history.

(56) References Cited

U.S. PATENT DOCUMENTS

| | | | |
|---|---|---|---|
| 1,651,832 A * | 12/1927 | Morse | 474/216 |
| 1,769,960 A | 7/1930 | Morse | |
| 5,090,947 A * | 2/1992 | van Rooij | 474/240 |
| 5,728,021 A | 3/1998 | van Rooij et al. | |
| 2005/0187057 A1* | 8/2005 | Lou | 474/245 |
| 2007/0026988 A1* | 2/2007 | Fuse | 474/242 |
| 2007/0191166 A1* | 8/2007 | Yasuhara et al. | 474/245 |
| 2008/0161148 A1* | 7/2008 | Tada et al. | 474/245 |

FOREIGN PATENT DOCUMENTS

| | | |
|---|---|---|
| EP | 1624225 | 2/2006 |
| GB | 2128 | 0/1898 |
| JP | 2006-2783 | 1/2006 |
| JP | 2006-002783 | 1/2006 |
| JP | 2006-2784 | 1/2006 |
| JP | 2006-97857 | 4/2006 |

OTHER PUBLICATIONS

European Search Report dated Mar. 6, 2008.

* cited by examiner

*Primary Examiner*—Robert A Siconolfi
*Assistant Examiner*—Anna Momper
(74) *Attorney, Agent, or Firm*—McGinn IP Law Group, PLLC

(57) ABSTRACT

Two kinds of pins having rolling contact surfaces of different shapes are used as first pins. A recess is formed at that portion of the first pin disposed between a chain outer periphery-side edge portion thereof and the rolling contact surface thereof. A straight portion is formed at that portion of the second pin disposed between a chain outer periphery-side edge portion thereof and the rolling contact surface thereof. With this construction, the two kinds of pins can be easily discriminated from each other from their appearance.

10 Claims, 4 Drawing Sheets

POWER TRANSMISSION CHAIN AND POWER TRANSMISSION APPARATUS

BACKGROUND OF THE INVENTION

1. Field of the Invention

This invention relates to a power transmission chain, and more particularly to a power transmission chain and a power transmission apparatus suited for a continuously variable transmission (CVT) of a vehicle such as an automobile.

2. Related Art

As a continuously variable transmission for an automobile, there is know the type (as shown in FIG. 4) which comprises a driving pulley 2 having a fixed sheave 2a and a movable sheave 2b and operatively connected to an engine, a driven pulley 3 having a fixed sheave 3b and a movable sheave 3a and operatively connected to a drive wheel, and an endless power transmission chain 1 extending around the two pulleys. Each movable sheave 2b, 3a is moved toward and away from the corresponding fixed sheave 2a, 3b by a hydraulic actuator, and by doing so, the chain 1 is clamped by hydraulic pressure, and by this clamping force, a contact load is caused to develop between each pulley 2, 3 and the chain 1, and a torque is transmitted by a frictional force of this contact portion.

As the power transmission chain 1, there is known the type (as shown in FIG. 5) which comprises a plurality of links 30 having front and rear passage portions (through holes) 31 and 32 for the passage of pins 34A, 34B, 35A and 35B therethrough, and the plurality of first pins 34A and 34B and the plurality of second pins 35A and 35B which interconnect the links 30 arranged in a width of the chain in such a manner that the front passage portion 31 of one link 30 corresponds to the rear passage portion 32 of other link 30 so that the links 30 can be bent relative to each other in a direction of a length of the chain. The first pin 34A, 34B fixedly fitted in the front passage portion 31 of one link 30 and movably fitted in the rear passage portion 32 of other link 30 and the mating second pin 35A, 35B movably fitted in the front passage portion 31 of the one link 30 and fixedly fitted in the rear passage portion 32 of the other link 30 move relative to each other in rolling contact with each other so that the links 30 can be bent relative to each other in the chain lengthwise direction (See JP-A-2006-002783 Publication).

In JP-A-2006-002783 Publication, it is proposed to use two kinds of combinations of pins 34A, 34B, 35A and 35B having the rolling contact surfaces of different shapes. Namely, in FIG. 5, the rolling contact surface of one first pin 34A is formed into an involute surface with a base radius (a radius of a base circle) R1, and the rolling contact surface of the other first pin 34B is formed into an involute surface with a base radius R2, and by doing so, noises are reduced.

With respect to the two kinds of pins having the rolling contact surfaces of different shapes, the difference in the base radius is such that for example, one is 100 while the other is 130, and the profiles or contours of the two rolling contact surfaces are almost the same when viewed with the eyes, and the two kinds of actual products (pins) can not be discriminated from each other, and there has been a possibility that wrong pins are inadvertently mixed in the pins.

SUMMARY OF THE INVENTION

It is an object of this invention to provide a power transmission chain and a power transmission apparatus in which pins of different kinds which have almost the same profile or contour when viewed with the eyes, and therefore can not be discriminated from each other from the appearance of their actual products can be discriminated from each other, thereby eliminating the possibility that wrong pins are inadvertently mixed in the pins.

According to one aspect of the present invention, there is provided a power transmission chain comprising a plurality of links each having front and rear passage portions (through holes) for the passage of pins therethrough, the plurality of first pins, and the plurality of second pins, wherein the first pins and the second pins are arranged in a forward-rearward direction, and interconnect the links arranged in a direction of a width of the chain in such a manner that the front passage portion of one link corresponds to the rear passage portions of other link, and the first pin and the mating second pin move relative to each other in rolling contact with each other so that the links can be bent relative to each other in a direction of a length of the chain; characterized in that two kinds of pins having rolling contact surfaces of different shapes are used as the first pins; and a discrimination portion is formed at that portion of each of the first pins of two kinds disposed between a chain outer periphery-side edge portion thereof and the rolling contact surface thereof, and enables the first pin of one of the two kinds to be easily discriminated from the first pin of the other kind from their appearance.

As the second pins, there are used one kind of second pins which can be used commonly for the two kinds of first pins, but the second pins are not limited to this form.

Preferably, one of the first and second pins is fixed to a pin fixing portion at a front side portion of the front passage portion of one link and also is movably fitted in a pin movable portion at a front side portion of the rear passage portion of other link. The other pin is movably fitted in a pin movable portion at a rear side portion of the front passage portion of the one link and also is fixed to a pin fixing portion at a rear side portion of the rear passage portion of the other link.

In this case, the pin in the pin fixing portion is press-fitted at its upper and lower edge portions (that is, its chain outer periphery-side edge portion and chain inner periphery-side edge portion), and that surface of this pin facing away from the rolling contact surface thereof contacts an inner surface of the pin fixing portion to bear a force in the direction of the chain. Furthermore, the pin in the pin movable portion has its upper and lower edges portions serving as guide surfaces, and is guided by a peripheral surface of the movable portion through these guide surfaces. Therefore, it is preferred that the upper and lower edge portions of the pin, as well as the surface of the pin facing away from the rolling contact portion, should have a smooth shape having no recess. On the other hand, other members (such as the pin and the link) will not contact that surface of the pin disposed between the chain outer periphery-side edge portion and the rolling contact surface, and therefore the discrimination portion (such for example as a recess) is formed at this non-contact surface, and by doing so, the pins of two kinds can be discriminated from each other without affecting the other performances at all.

In the above power transmission chain, for example, the discrimination portion of the first pin of one of the two kinds has a straight shape in transverse cross-section, while the discrimination portion of the first pin of the other kind has a concave generally-arc-shape in transverse cross-section. With this construction, the two kinds of pins can be easily discriminated from each other only from the appearance.

The fixing of the pin to the pin fixing portion is effected by fit fixing of the outer peripheral surface of the pin to the inner edge of the pin fixing portion, for example, by mechanical press fit. However, instead of this fit fixing, shrinkage fit or expansion fit can be used. After the fit fixing, pretension is applied in a pretension applying process, thereby applying a proper residual compressive stress uniformly to the pin fixing portion (pin press-fit portion) of the link.

In the power transmission chain of the invention, at least one of the first pins and the second pins contact the pulley, and power is transmitted by a frictional force. In the type of chain in which one of first pins and second pins contact pulleys when this chain is used in a continuously variable transmission, and those pins which contact the pulleys are called "pins", and will hereinafter be referred to as "first pins" or "pins", while those pins which do not contact the pulleys are called "inter-pieces" or "strips", and will hereinafter be referred to as "second pins" or "inter-pieces".

Each link is made, for example, of spring steel or carbon tool steel. The material of the link is not limited to spring steel and carbon tool steel, and any other suitable steel such as bearing steel can be used. The link may be of the type (pillared link) in which the front and rear passage portions are defined respectively by two independent through holes, or may be of the type (non-pillared link) in which the front and rear passage portions are defined by a single through hole. As a material for the pins, suitable steel such as bearing steel is used.

Preferably, the contact surface of the second pin is formed into a flat surface, and the contact surface of the first pin is formed into an involute surface which can move relative to the second pin in rolling contact therewith. Preferably, the second pin is smaller in width than the first pin, and in this case projecting edge portions are often formed respectively at the upper and lower edge portions of the second pin.

In the present specification, although one end of the link in its longitudinal direction is called "the front (forward side)" while the other end is called "the rear (rearward side)"; the terms "the front and rear" are used for convenience' sake, and do not mean that the direction of the length of the link is always in agreement with the forward-rearward direction.

In the above power transmission chain, preferably, one (inter-piece) of the mating pins is shorter than the other pin (pin), and the opposite end surfaces of the longer pin contact conical sheave surfaces of each pulley, respectively, in the continuously variable transmission, and power is transmitted by a frictional force due to this contact. Each pulley includes a fixed sheave having the conical sheave surface, and a movable sheave having the conical sheave surface opposed to the sheave surface of the fixed sheave. The chain is gripped between the sheave surfaces of the two sheaves, and the movable sheave is moved by a hydraulic actuator so as to change the distance between the opposed sheave surfaces in the continuously variable transmission and hence the radius of winding of the chain around the pulley, thereby smoothly changing the speed in a stepless manner.

According to another aspect of the invention, there is provided a power transmission apparatus comprising a first pulley having conical sheave surfaces, a second pulley having conical sheave surfaces, and a power transmission chain extending around the first and second pulleys. As the power transmission chain of this apparatus, the power transmission chain of the above construction is used.

This power transmission apparatus is suitably used in a continuously variable transmission of a vehicle such as an automobile.

In the power transmission apparatus of the present invention, the pins of different kinds which can not be discriminated from each other from the appearance of their actual products can be discriminated from each other, thereby eliminating the possibility that wrong pins are mixed in the pins. The discrimination portion is formed at the portion of each first pin disposed between the chain outer periphery-side edge portion thereof and the rolling contact surface thereof, and by doing so, the other performances will not be affected, and the reliability is markedly enhanced.

DETAILED DESCRIPTION OF THE PREFERRED EMBODIMENTS

A preferred embodiment of the present invention will now be described with reference to the drawings. In the following description, the upper and lower sides correspond to the upper and lower sides in FIG. 2.

Figure 1:
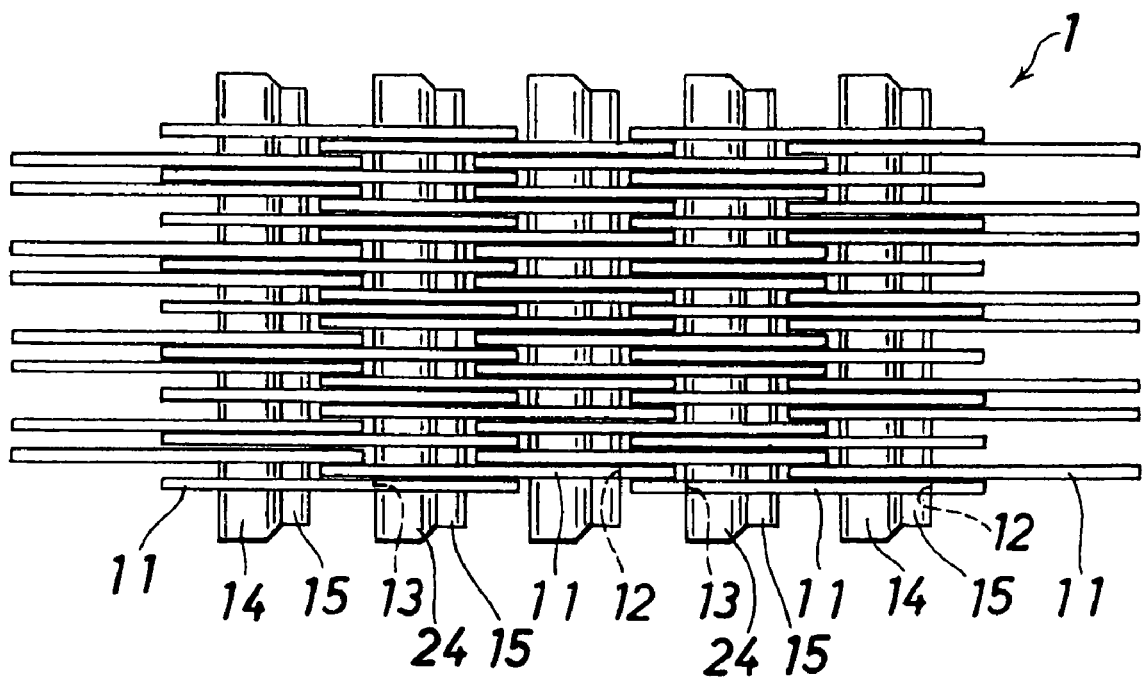
FIG. 1 is a plan view showing a portion of one preferred embodiment of a power transmission chain of the present invention.

FIG. 1 shows part of a power transmission chain of the present invention, and this power transmission chain 1 comprises a plurality of links 11 each having front and rear passage portions 12 and 13 (through holes) spaced a predetermined distance from each other in a direction of a length of the chain, and a plurality of pins (first pins) 14 and 24 and a plurality of inter-pieces (second pins) 15 which interconnect the links 11 arranged in a direction of a width of the chain so that the links 11 can be bent relative to each other in the chain lengthwise direction. The inter-piece 15 is shorter than the pins 14 and 24, and each inter-piece 15 and the mating pin 14, 24 are opposed to each other in such a manner that the inter-piece 15 is disposed at the front side while the pin 14, 24 is disposed at the rear side.

In this chain, there are used two kinds of pins 14 and 24 having rolling contact surfaces of different shapes, and one kind of inter-pieces (second pins) 15 are used commonly for the pins 14 and 24.

Three link rows each comprising a row of links 11 disposed in phase with each other in the chain widthwise direction are arranged in an advancing direction (forward-rearward direction) to form one link unit, and a plurality of link units each comprising the three link rows are interconnected in the advancing direction to form the chain 1. In this embodiment, one link row comprising nine links 11 and two link rows each comprising eight links 11 jointly form one link unit.

Figure 2:
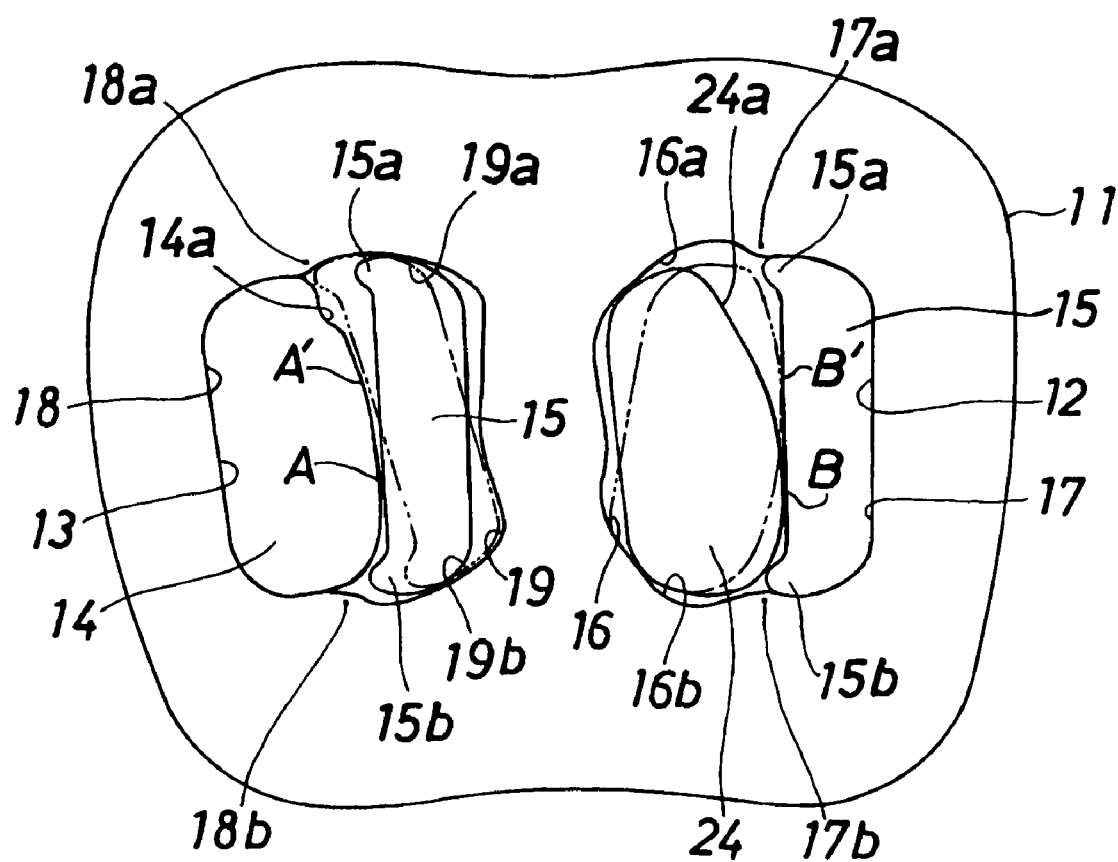
FIG. 2 is an enlarged side-elevational view of a link and pins.
Figure 3:
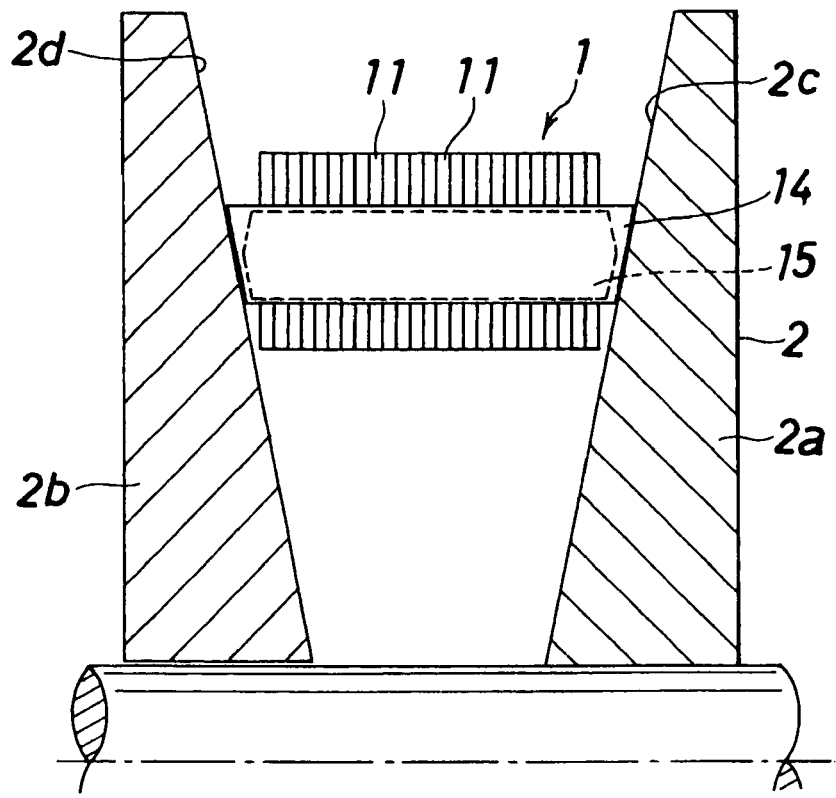
FIG. 3 is a front-elevational view showing a condition in which the power transmission chain is mounted on a pulley.

As shown in FIG. 2, each of the pins 14a and 24 is larger in width (in the forward-rearward direction) than the inter-piece 15. Projecting edge portions 15a and 15b are formed respectively at upper and lower edges of the inter-piece 15, and extend toward the mating pin 14, 24. The front passage portion 12 of the link 11 includes a pin movable portion 16 in which one pin 24 is movably fitted, and an inter-piece fixing portion 17 to which the inter-piece 15 is fixed. The rear passage portion 13 of the link 11 includes a pin fixing portion 18 to which the other pin 14 is fixed, and an inter-piece movable portion 19 in which the inter-piece 15 is movably fitted. For interconnecting the links 11 arranged in the chain widthwise direction, the links 11 are stacked together in such a manner that the front passage portion 12 of one link 11 corresponds to the rear passage portions 13 of other link 11, and the pin 14, 24 is fixed to the rear passage portion 13 of one link 11 and also is movably fitted in the front passage portions 12 of other link 11, while the inter-piece 15 is movably fitted in the rear passage portion 13 of the one link 11 and also is fixed to the front passage portions 12 of the other link 11. Then, each pin 14, 24 and the mating inter-piece 15 move relative to each other in rolling contact with each other so that the links 11 can be bent relative to each other in the chain lengthwise direction (the forward-rearward direction).

Upper and lower convex generally-arc-shaped holding portions 18a and 18b for holding the pin 14 fixed to the pin fixing portion 18 are formed at a boundary portion between the pin fixing portion 18 and the inter-piece movable portion 19 of the link 11, and are continuous respectively with upper and lower concave generally-arc-shaped guide portions 19a and 19b of the inter-piece movable portion 19. Similarly, upper and lower convex generally-arc-shaped holding portions 17a and 17b for holding the inter-piece 15 fixed to the inter-piece fixing portion 17 are formed at a boundary portion between the inter-piece fixing portion 17 and the pin movable portion 16, and are continuous respectively with upper and lower concave generally-arc-shaped guide portions 16a and 16b of the pin movable portion 16.

A locus of a position of contact between the pin 14, 24 and the inter-piece 15 obtained when using the pin 14, 24 as a reference is an involute of a circle, and in this embodiment the contact surface of the pin 14, 24 has an involute shape (in cross-section) having a base circle with a radius Rb and a center M, and the contact surface of the inter-piece 15 is a flat surface (having a straight cross-sectional shape). With this construction, when each link 11 shifts from a straight portion to a curved portion of the chain 1 or from the curved portion to the straight portion, the pin 24 in the front passage portion 12 moves within the pin movable portion 16 relative to the mating inter-piece 15 held in the fixed condition while its contact surface moves in rolling contact (including slight sliding contact) with the contact surface of the inter-piece 15. At this time, in the rear passage portion 13, the inter-piece 15 moves within the inter-piece movable portion 19 relative to the pin 14 held in the fixed condition while its contact surface moves in rolling contact (including slight sliding contact) with the contact surface of the pin 14.

Regions designated respectively by reference characters A and B in FIG. 2 respectively indicate lines (points in cross-section) at which the pins 14 and 24 contact the respective inter-pieces 15 at the straight portion of the chain 1. The distance between the regions A and B is the pitch. At the curved portion of the chain 1, the pin 14 and 24 move relative to the respective inter-pieces 15 in rolling contact therewith, and are moved to respective positions indicated by dots-and-dash lines in FIG. 2, so that the their contact positions shift respectively to regions A' and B'.

In the above power transmission chain 1, the pins are repeatedly moved upward and downward, so that polygon vibrations develop, and this is the cause of noises. However, the pins 14 and 24 move relative to the respective inter-pieces 15 in rolling contact therewith, and besides the locus of the position of contact between the pin 14, 24 and the inter-piece 15 obtained when using the pin 14, 24 as a reference is the involute of the circle. With this construction, vibrations can be reduced, and noises can be reduced as compared with the case where the contact surfaces of the pin and the inter-piece are both arc-shaped surfaces. Furthermore, the two kinds of pins 14 and 24 have the rolling contact surfaces of different shapes, respectively, and these are arranged randomly. With this arrangement, cycles of generation of hammering sounds are deviated, and the energy of the sound is dispersed to different frequency bands, and a peak of the sound pressure level is reduced, so that the above noise reduction effect is further enhanced.

In order that the two kinds of pins 14 and 24 can have the respective rolling contact surfaces of different shapes, one pin (the left pin in FIG. 2) 14 is made larger in the radius (base radius) of the base circle than the other pin (the right pin in FIG. 2) 24. The difference in the base radius is such that for example, one is 40 while the other is 50, and this difference can not be recognized with the eyes. Therefore, a discrimination recess 14a is formed in the left pin 14 with the larger base radius at a portion thereof beyond the rolling contact surface A-A', while a discrimination straight portion 24a is formed on the right pin 24 with the smaller base radius at a portion thereof beyond the rolling contact surface B-B'. As a result, the two kinds of pins 14 and 24 can be discriminated from each other merely by confirming whether these pins have the recess 14a or not, and there is no fear that wrong pins are inadvertently mixed into the pins in the assembling operation, etc.

For producing this power transmission chain 1, a required number of pins 14 and 24 and a required number of inter-pieces 15 are held upright on a bed, and thereafter the links 11 are press fitted relative thereto either one by one or several at a time. In this press-fitting operation, the upper and lower edge portions of the pin 14, 24 are press-fitted respectively to the upper and lower edge portions of the pin fixing portion 18, and similarly the upper and lower edge portions of the inter-piece 15 are press-fitted respectively to the upper and lower edge portions of the inter-piece fixing portion 17. This press-fitting interference is 0.005 mm to 0.1 mm. Thus, tension (pretension) is applied to the assembled chain 1.

Figure 4:
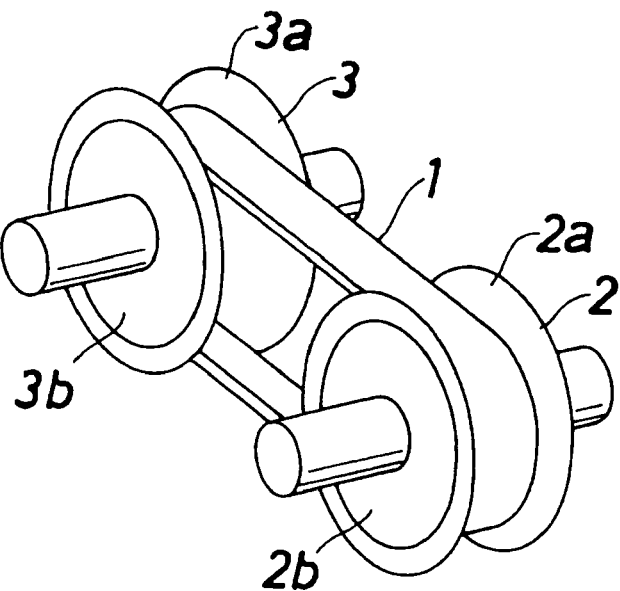
FIG. 4 is a perspective view showing a continuously variable transmission.

The above power transmission chain is used in a CVT shown in FIG. 4. At this time, the opposite end surfaces of each pin 14, 24 are brought into contact respectively with conical sheave surfaces 2c and 2d of a fixed sheave 2a and a movable sheave 2b of a pulley 2, while the opposite end surfaces of each inter-piece 15 do not contact the conical sheave surfaces 2c and 2d. Power is transmitted by a frictional force of this contact. Each pin 14, 24 and the mating inter-piece 15, while guided respectively by the movable portions 16 and 19, are moved in rolling contact with each other, and therefore the pin 14, 24 is hardly rotated relative to the sheave surfaces 2c and 2d of the pulley 2, and a frictional loss is reduced, and a high mechanical efficiency of power transmission is secured.

Figure 5:
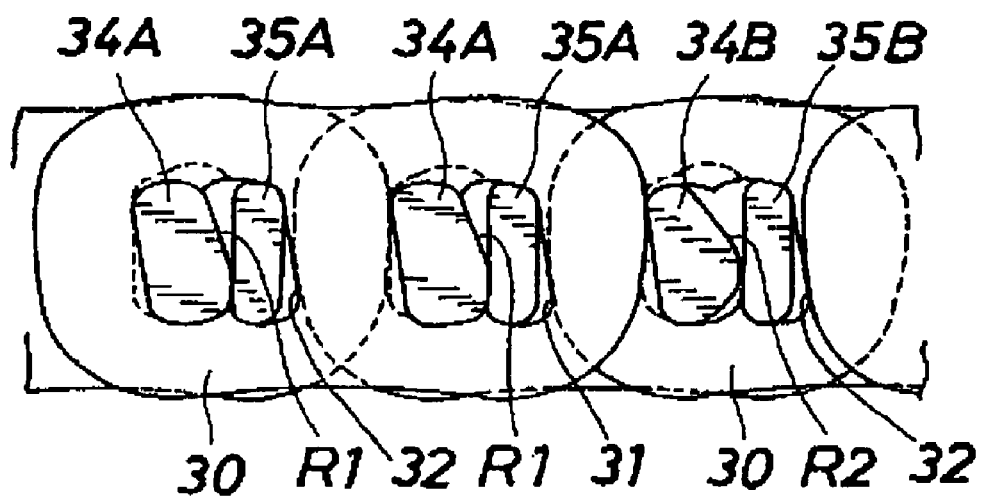
FIG. 5 is a plan view showing a portion of a conventional power transmission chain.

In the above embodiment, the projecting edge portions 15a and 15b are formed respectively at the upper and lower edge portions of the inter-piece 15. However, even in the case where inter-pieces (35A and 35B) as shown in FIG. 5 (illustrating the conventional technique) are used, similar effects as described above can be obtained by forming a recess in one of pins 34A and 34B of two kinds and by forming a straight portion on the other pin. Furthermore, in the above embodiment, only one kind of inter-pieces 15 are used, and therefore there is no need to provide discrimination means on the inter-pieces. However, in the case where two kinds of inter-pieces are used, discrimination portions are provided on the inter-pieces.

What is claimed is:
1. A power transmission chain comprising:
a plurality of first pins;
a plurality of second pins; and
a plurality of links each having front and rear passage portions for the passage of the first and second pins therethrough, wherein the first pins and the second pins are arranged in a forward-rearward direction, and interconnect the links arranged in a direction of a width of the chain such that the front passage portion of one link corresponds to the rear passage portion of other link, and the first pin and the mating second pin move relative to each other in rolling contact with each other such that the links can be bent relative to each other in a direction of a length of the chain, wherein the plurality of first pins comprise a length which is substantially equal in an axial direction, wherein two kinds of pins comprising rolling contact surfaces of different shapes are used as the plurality of first pins, wherein a discrimination portion is formed at a part of each of the first pins of two kinds and disposed between a chain outer periphery-side edge portion thereof and the rolling contact surface thereof, and enables the first pin of one of the two kinds to be discriminated from the first pin of the other kind from their appearance, and wherein the discriminatio portion of a first pin of the one kind of the plurality of first pins comprises a straight shape in transverse cross-section, while the discrimination portion of a first pin of the other kind of the pluiality of first pins comprises a concave generally-arc-shape in transverse cross-section.

2. A power transmission apparatus comprising:
a first pulley comprising conical sheave surfaces;
a second pulley comprising conical sheave surfaces; and
a power transmission chain extending around the first and second pulleys,
wherein a power transmission chain according to claim 1 is used as said power transmission chain.

3. A power transmission chain according to claim 1, wherein the plurality of second pins comprise the same shape.

4. A power transmission chain according to claim 1, wherein the plurality of first pins comprise a width in the forward-rearward direction greater than a width of the plurality of second pins in the forward-rearward direction.

5. A power transmission chain according to claim 1, wherein the plurality of second pins have a length in the axial direction which is less than a length in the axial direction of the plurality of first pins.

6. A power transmission chain according to claim 1, wherein the plurality of second pins further comprise projecting edge portions formed at a chain outer periphery-side edge portion.

7. A power transmission chain according to claim 1, wherein a radius of the rolling contact surface of a first pin of the plurality of first pins is greater than a radius of the rolling contact surface of another pin of the plurality of first pins.

8. A power transmission chain according to claim 1, wherein a first pin of the plurality of first pins and a second pin of the plurality of second pins pass through the front passage portion and another first pin of the plurality of first pins and another second pin of the plurality of second pins pass through the rear passage portion.

9. A power transmission chain according to claim 1, wherein the discrimination portion of a plurality of the first pins comprises a recess.

10. A power transmission apparatus according to claim 2, wherein the plurality of first pins contact the conical sheave surfaces of the first pulley and the conical sheave surfaces of the second pulley.

* * * * *